Jan. 9, 1923. 1,441,671.
E. EICHMAN.
TIRE TOOL.
FILED MAR. 20, 1922. 2 SHEETS—SHEET 1.

Inventor
Emil Eichman
By J. E. Thomas
Attorney

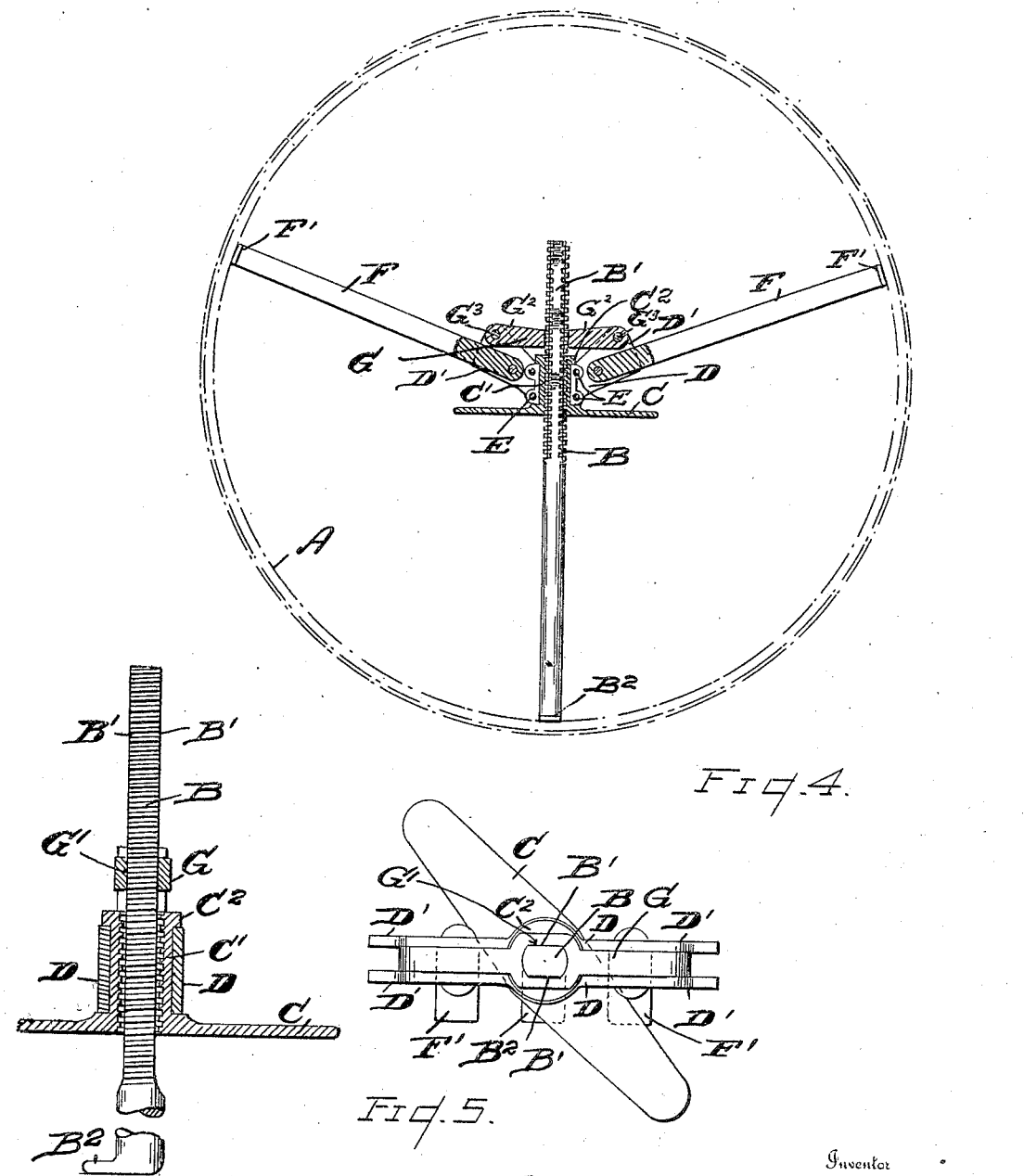

Patented Jan. 9, 1923.

1,441,671

UNITED STATES PATENT OFFICE.

EMIL EICHMAN, OF DETROIT, MICHIGAN.

TIRE TOOL.

Application filed March 20, 1922. Serial No. 545,077.

*To all whom it may concern:*

Be it known that I, EMIL EICHMAN, citizen of the United States, residing at Detroit, county of Wayne, State of Michigan, have invented a certain new and useful Improvement in Tire Tools, and declare the following to be a full, clear, and exact description of the same, such as will enable others skilled in the art to which it pertains to make and use the same, reference being had to the accompanying drawings, which form a part of this specification.

My invention relates to tire tools shown in the accompanying drawings and more particularly described in the following specification and claim.

The primary object of this invention is to provide a simple strong and efficient tool for removing and replacing tires upon the usual divided demountable rim of a motor driven vehicle.

A further object of the invention is to provide means not only to contract the rim whereby the tire may be removed but also to expand the rim after the tire is placed thereon, so that it may be readily mounted upon the vehicle wheel.

A further object of the invention is to provide a tool adapted to be folded into a relatively small compass for storage in a tool box or bag.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 4 is a side elevation and sectional view of the tool as applied to expand a rim, shown in dotted lines.

Figure 5 is a plan view of the tool, folded for a tool bag.

Figure 6 is a cross-sectional view of a detail of construction, with parts broken away.

Referring now to the letters of reference placed upon the drawings:

A, denotes a demountable divided rim of usual construction. B, indicates a screw-threaded bar, flattened on opposite sides as at B' having a laterally extending foot B² adapted to engage the tire rim. C, denotes a rotatable operating lever having an annular screw threaded bushing C' with a projecting rim C² adapted to overlap a pair of members D, D, embracing the bushing and secured together on each side of the latter by bolts E. Pivotally secured between the spaced walls D' D' of the members D, D, are bars F, F, having laterally projecting feet F' F' adapted to engage the wheel rim. G, is a fitting comprising a hub portion G' having an opening conforming in shape to the flattened sides of the screw-threaded bar B to secure it against rotation. Projecting in opposite directions from its hub are wings G², G² secured between the spaced walls of the members D, D, by bolts G³, G³ extending transversely through the latter.

Figure 1:
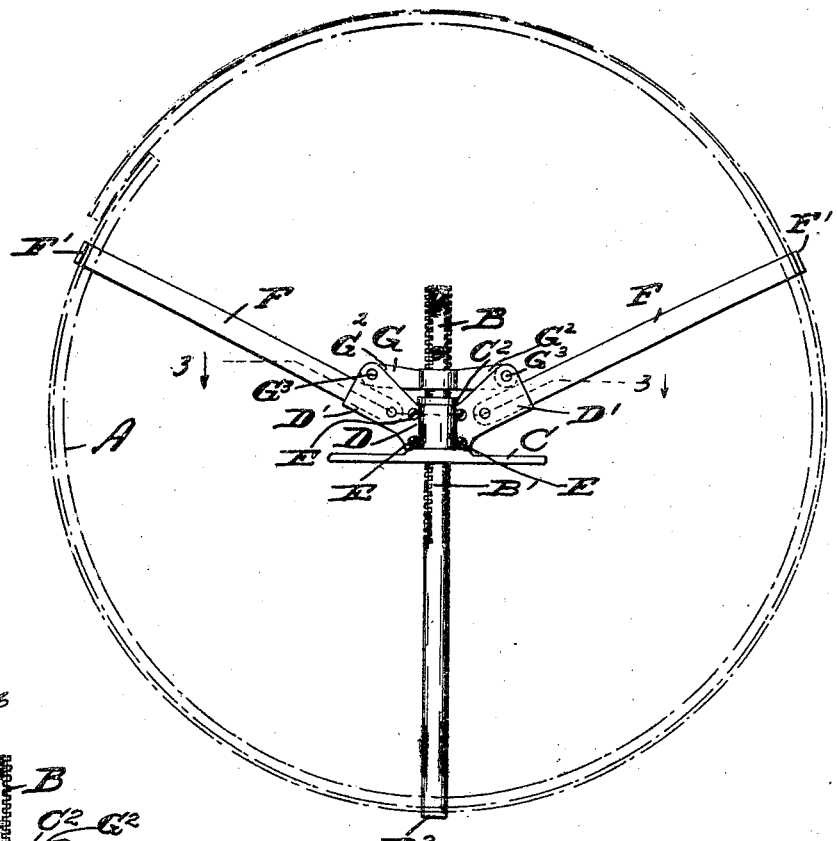
Figure 1 is a side elevation of the device applied to a divided tire rim (shown in dotted lines) contracted by the tool to release a tire, not shown.

Having now indicated the several parts by reference letters the construction and operation of the device will be readily understood:

It will first be assumed that the demountable rim with a tire (not shown) thereon has been removed from the wheel, the bars F, F, are then adjusted at an angle to the screw-threaded bar B as shown in Figure 1 with the feet of the respective bars engaging the outer edge of the demountable divided rim as shown. The lever C with its screw-threaded bushing is then rotated upon the bar B thereby contracting the divided rim so its ends may overlap as indicated in the drawing, thus freeing the tire from the rim whereby it may be readily withdrawn.

Figure 2:
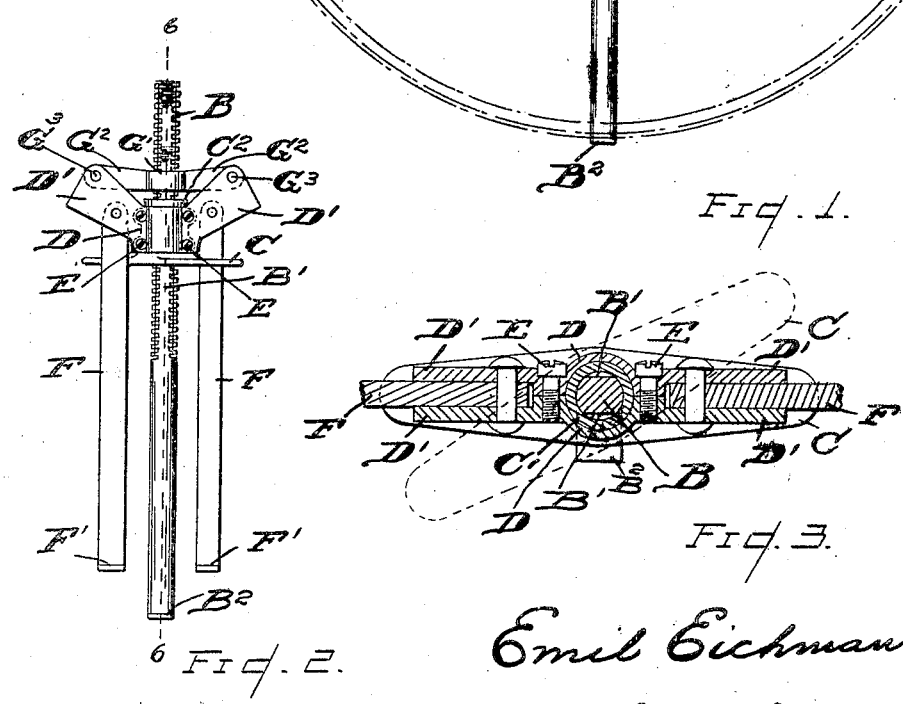
Figure 2 is a side elevation of the tool as it would appear when folded for a tool box.
Figure 3:
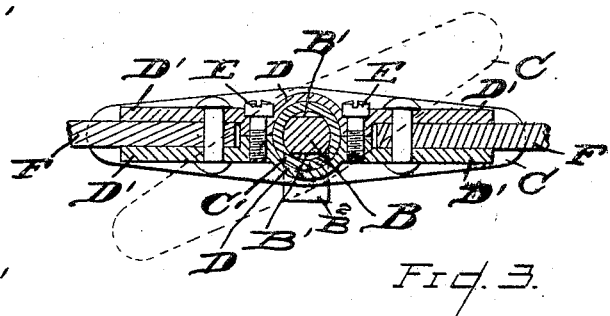
Figure 3 is a cross-sectional view with parts broken away taken on or about line 3—3 of Figure 1, with the operating lever rotated as shown in Figure 2 in dotted lines.

To replace the tire upon the rim, the feet of the respective bars F, F, and screw-threaded bar B are first placed adjacent to the inner edge of the rim with a tire (not shown) encircling the latter. The lever C is then rotated in the opposite direction to that just described thereby expanding the rim so that its ends may again abut as shown in Figure 4, the lever C is then rotated in a reverse direction sufficiently to release the device from the rim whereupon it is withdrawn and the legs folded as shown in Fig. 2 that it may be housed in a tool kit bag.

Having thus described my invention what I claim is:

In a device of the character described, a screw-threaded bar flattened on opposite faces with an extension or foot at one end to engage a divided rim, a bushing tapped to receive the screw-threaded portion of the bar, a divided fitting embracing the bushing with laterally extending walls spaced from each other and projecting in diametrically opposite directions from the bushing, a link bolted between the walls of the divided fitting and having an opening conforming to the flattened sides of the screw-threaded bar and through which the latter projects adapted to secure the bar against rotation, a pair of swinging bars also pivoted between the divided fitting and provided at their ends with a lateral extension or foot to engage a divided rim, and a lever integral with the bushing for rotating the latter.

In testimony whereof, I sign this specification in the presence of two witnesses.

EMIL EICHMAN.

Witnesses:
L. E. Thomas,
Maurice Wolf.